US011015294B2

(12) United States Patent
Zhou et al.

(10) Patent No.: US 11,015,294 B2
(45) Date of Patent: May 25, 2021

(54) METHOD FOR PREPARING TITANIUM DIOXIDE-BASED SYNTHETIC PAPER

(71) Applicant: HUNAN UNIVERSITY OF SCIENCE AND TECHNOLOGY, Hunan (CN)

(72) Inventors: Hu Zhou, Hunan (CN); Dongdong Wang, Hunan (CN); Zhiling Qi, Hunan (CN); Xuan Liu, Hunan (CN); Zhihua Zhou, Hunan (CN); Qingquan Liu, Hunan (CN); Xiaofang Li, Hunan (CN)

(73) Assignee: HUNAN UNIVERSITY OF SCIENCE AND TECHNOLOGY, Xingtan (CN)

( * ) Notice: Subject to any disclaimer, the term of this patent is extended or adjusted under 35 U.S.C. 154(b) by 202 days.

(21) Appl. No.: 16/009,176

(22) Filed: Jun. 14, 2018

(65) Prior Publication Data

US 2018/0291560 A1 Oct. 11, 2018

Related U.S. Application Data

(63) Continuation of application No. PCT/CN2017/074020, filed on Feb. 18, 2017.

(30) Foreign Application Priority Data

Oct. 31, 2016 (CN) .......................... 201610927186.4

(51) Int. Cl.

| | | |
|---|---|---|
| *D21H 17/67* | (2006.01) | |
| *D21H 17/57* | (2006.01) | |
| *D21H 17/07* | (2006.01) | |
| *D21H 19/72* | (2006.01) | |
| *D21H 19/62* | (2006.01) | |
| *D21H 25/02* | (2006.01) | |
| *D21H 25/06* | (2006.01) | |
| *D21H 19/38* | (2006.01) | |
| *D21H 27/00* | (2006.01) | |
| *C01G 23/047* | (2006.01) | |
| *C08L 75/06* | (2006.01) | |
| *C08L 75/08* | (2006.01) | |
| *D21H 13/20* | (2006.01) | |
| *C09D 175/08* | (2006.01) | |
| *C09D 175/06* | (2006.01) | |
| *C08K 3/22* | (2006.01) | |

(52) U.S. Cl.
CPC ......... *D21H 17/675* (2013.01); *C01G 23/047* (2013.01); *C08L 75/06* (2013.01); *C08L 75/08* (2013.01); *C09D 175/06* (2013.01); *C09D 175/08* (2013.01); *D21H 13/20* (2013.01); *D21H 17/07* (2013.01); *D21H 17/57* (2013.01); *D21H 19/385* (2013.01); *D21H 19/62* (2013.01); *D21H 19/72* (2013.01); *D21H 25/02* (2013.01); *D21H 25/06* (2013.01); *D21H 27/00* (2013.01); *C01P 2004/60* (2013.01); *C08K 2003/2241* (2013.01); *C08K 2201/005* (2013.01); *C08L 2203/16* (2013.01); *C08L 2205/02* (2013.01)

(58) Field of Classification Search
CPC ........ D21H 17/57; D21H 25/06; D21H 13/20; D21H 17/07; D21H 17/63; D21H 17/675; D21H 19/385; D21H 19/62; D21H 19/72; D21H 21/52; D21H 27/00; D21H 27/001; C09D 175/06; C09D 175/08; C09D 175/04
See application file for complete search history.

(56) References Cited

U.S. PATENT DOCUMENTS

| | | | | |
|---|---|---|---|---|
| 3,650,880 A | * | 3/1972 | Tieniber | .................. C08J 9/28 442/76 |
| 3,794,548 A | * | 2/1974 | Wirth et al. | ......... D06N 3/0095 428/91 |
| 4,157,424 A | * | 6/1979 | Boutle | ................. D06N 3/0088 521/61 |
| 4,448,922 A | * | 5/1984 | McCartney | ........ C08G 18/0804 524/443 |
| 5,326,567 A | * | 7/1994 | Capelli | ..................... A46D 1/00 424/405 |
| 6,777,524 B1 | * | 8/2004 | Shimizu | ................. C08G 18/10 528/59 |

(Continued)

FOREIGN PATENT DOCUMENTS

| | | |
|---|---|---|
| CN | 1401700 A | 3/2003 |
| CN | 102294052 A | 12/2011 |

(Continued)

OTHER PUBLICATIONS

Paul et al., "Antimicrobial, Mechanical and Thermal Studies of Silver Particle-Loaded Polyurethane" Journal Biomaterials, 4, pp. 358-375. (Year: 2013).*

(Continued)

*Primary Examiner* — Jose A Fortuna

(57) ABSTRACT

A method for preparing titanium dioxide-based synthetic paper capable of degrading organic pollutants, including: adding thermoplastic polyurethane particles and N,N-dimethylformamide or N,N-dimethylacetamide in a reactor, heating, and stirring to fully dissolve the thermoplastic polyurethane particles in a solvent to obtain a polyurethane solution; adding titanium dioxide powder having photocatalytic degradation property in the polyurethane solution, stirring uniformly to obtain a solid-liquid mixture, and standing for defoaming; uniformly coating the solid-liquid mixture onto a piece of release paper, soaking the release paper coated with the solid-liquid mixture into an aqueous solution of sliver nitrate having photocatalytic degradation property, completely curing the solid-liquid mixture to form a film, and soaking the release paper and the film into an aqueous solution of sodium chloride; drying, cooling, removing the release paper, and cutting the film to a proper size to obtain the titanium dioxide-based synthetic paper.

8 Claims, No Drawings

(56) References Cited

U.S. PATENT DOCUMENTS

| | | | |
|---|---|---|---|
| 8,728,501 B2* | 5/2014 | Fan | C01G 23/0536 |
| | | | 424/401 |
| 2008/0004395 A1* | 1/2008 | Covelli | C08G 18/12 |
| | | | 524/591 |
| 2009/0247658 A1* | 10/2009 | Kobayashi | C08G 18/10 |
| | | | 521/159 |
| 2009/0253848 A1* | 10/2009 | Koecher | A01N 59/16 |
| | | | 524/440 |
| 2011/0201734 A1* | 8/2011 | Liu | C08G 18/0823 |
| | | | 524/196 |
| 2013/0236719 A1* | 9/2013 | Ohwada | B29C 51/002 |
| | | | 428/327 |
| 2014/0205759 A1* | 7/2014 | Satgurunathan | C08G 18/0823 |
| | | | 427/388.4 |
| 2016/0136584 A1* | 5/2016 | Hwang | B29C 70/504 |
| | | | 210/483 |
| 2018/0291559 A1* | 10/2018 | Zhou | D21H 21/52 |
| 2018/0291560 A1* | 10/2018 | Zhou | D21H 27/00 |
| 2019/0225834 A1* | 7/2019 | Ho | C08G 18/289 |
| 2020/0095730 A1* | 3/2020 | Ekman | D21D 5/28 |

FOREIGN PATENT DOCUMENTS

| | | |
|---|---|---|
| CN | 102432898 A | 5/2012 |
| CN | 105057003 A | 11/2015 |
| JP | 2004256794 A | 9/2004 |
| KR | 20160090576 A | 8/2016 |

OTHER PUBLICATIONS

Machine translation of CN102604030 A. (Year: 2012).*
Machine translation of JP 2004-256794 A. (Year: 2004).*
Mogal et al., "Single-Step Synthesis of Silver-Doped Titanium Dioxide: Influence of Silver on Structural, Textural, and Photocatalytic Properties" I&EC research, vol. 53, pp. 5749-5758 (Year: 2014).*
Durango-Giraldo et al., "Titanium dioxide modified with silver by two methods for bactericidal applications" Heliyon, 5, pp. 1-6. (Year: 2019).*

* cited by examiner

METHOD FOR PREPARING TITANIUM DIOXIDE-BASED SYNTHETIC PAPER

TECHNICAL FIELD

The present invention belongs to the technical field of the production of organic-inorganic composites, and in particular to a method for preparing titanium dioxide-based synthetic paper.

BACKGROUND OF THE PRESENT INVENTION

Synthetic paper is also called second-generation paper. Such synthetic paper is novel paper that is prepared from polymer material and inorganic filler as main raw materials by a special process. As a polymer-based paper product, the synthetic paper may be widely applied in various fields such as indoor decoration wallpaper, advertising paper and high-grade books.

At present, although synthetic paper products have good writing and printing performance, these synthetic paper products still have some deficiencies when used as indoor decoration wallpaper. For example, they are unable to degrade formaldehyde, benzene, ammonia and other organic pollutants. With the improvement of people's environmental protection consciousness, the indoor air quality has received more and more attention. Formaldehyde, benzene, ammonia and the like are regarded as main organic pollutants. These organic pollutants will highly irritate the human skin and mucosa and will lead to human immunity dysfunctions and liver and lung injury, or even serious diseases such as nasopharynx cancer and laryngeal carcinoma, so that the human health is seriously endangered. Therefore, it is necessary to improve the composition and production process of the synthetic paper used for indoor decoration. Only by catalytically degrading indoor organic pollutants such as formaldehyde, benzene and ammonia into pollution-free substances by a special function of the synthetic paper, the indoor air can be purified effectively. In this way, the synthetic paper with a special function will have a more promising development prospect in the field of indoor decoration wallpaper.

SUMMARY OF THE PRESENT INVENTION

An objective of the present invention is to provide a method for preparing titanium dioxide-based synthetic paper.

The present invention employs the following technical solutions.

A method for preparing titanium dioxide-based synthetic paper is provided, including the following steps:

(1) adding thermoplastic polyurethane particles and N,N-dimethylformamide or N,N-dimethylacetamide in a reactor at a mass ratio of 22-30:110, heating to 50° C. to 80° C., and stirring to fully dissolve the thermoplastic polyurethane particles in a solvent to obtain a polyurethane solution;

(2) adding titanium dioxide powder in the polyurethane solution obtained in the step (1) at a mass ratio of the polyurethane solution to the titanium dioxide powder of 132-140:25-50, stirring uniformly by a high-speed stirrer to obtain a solid-liquid mixture, and standing for 5 h to 8 h for defoaming;

(3) uniformly coating the solid-liquid mixture obtained in the step (2) onto a piece of release paper, soaking the release paper into an aqueous solution of silver nitrate for 30 min to 60 min, completely curing the solid-liquid mixture to form a film, and soaking the release paper and the film into an aqueous solution of sodium chloride for 30 min to 60 min;

(4) drying the release paper and the film obtained in the step (3) in an oven for 1 h to 2 h at 50° C. to 60° C., cooling the release paper and the film, removing the release paper, and cutting the film to a proper size according to practical application requirements to obtain the titanium dioxide-based synthetic paper.

Further, the titanium dioxide-based synthetic paper obtained in the step (4) is white, the thickness of the titanium dioxide-based synthetic paper is controlled between 0.10 mm to 0.25 mm by adjusting the thickness of the solid-liquid mixture coated onto the release paper in the step (3), and the mass of the titanium dioxide-based synthetic paper as a piece of A4 paper is 5.10 g to 7.14 g.

Further, the titanium dioxide is titanium dioxide powder having a particle size of 325 to 2500 meshes.

Further, the thermoplastic polyurethane material (TPU) is preferably one or two of polyether-based TPU and polyester-based TPU, in form of particles having a Shore hardness of 85 A to 95 A.

Further, the solvent in the step (1) is preferably one of N,N-dimethylformamide and N,N-dimethylacetamide.

Further, in the solid-liquid mixture obtained in the step (2), the mass percentage of the polyurethane is preferably 12.1% to 16.2%, the mass percentage of the solvent is preferably 59.5% to 68.8%, and the mass percentage of the titanium dioxide is preferably 15.6% to 27.5%.

Further, in the step (3), the mass percentage of the aqueous solution of silver nitrate is preferably 3% to 6%, more preferably 5%; and the temperature is 20° C. to 35° C., more preferably 25° C.

Further, in the step (3), the mass percentage of the aqueous solution of sodium chloride is preferably 3% to 6%, more preferably 5%; and the temperature is 20° C. to 35° C., more preferably 25° C.

Compared with the existing production processes for synthetic paper, the present invention has the following advantages.

(1) The synthetic paper product of the present invention is of a porous structure which facilitates the adsorption of organic pollutants in the indoor air. During the production, lots of pores are formed both on the surface of the synthetic paper and inside the synthetic paper, by which the adsorption of the organic pollutants in the indoor air by the synthetic paper is improved greatly.

(2) The synthetic paper product of the present invention can effectively degrade organic pollutants under mild conditions. Inorganic filler can degrade the organic pollutants adsorbed onto the surface of the synthetic paper and inside the synthetic paper, with only nontoxic substance generated, so as to purify the indoor air.

DETAILED DESCRIPTION OF THE PRESENT INVENTION

The present invention will be further described below in detail by specific embodiments. The raw materials are industrial products, and the equipment is ordinary industrialized production equipment.

Embodiment 1

25 kg of polyether-based polyurethane particles having a Shore hardness of 85 A and 110 kg of N,N-dimethylformamide were added in a reactor, then heated to 50° C. and stirred to fully dissolve the polyether-based polyurethane particles to obtain a polyurethane solution. The polyurethane solution was added with 25 kg of titanium dioxide powder in 325 meshes and then uniformly stirred by a high-speed stirrer to obtain a solid-liquid mixture. The solid-liquid mixture was stood for 5 h for defoaming. Subsequently, the solid-liquid mixture was coated onto a piece of release paper at a certain thickness, and the release paper was soaked into an aqueous solution of silver nitrate having a mass percentage of 3% for 30 min (at 25° C.). After the solid-liquid mixture was completely cured to form a film, the release paper and the film are soaked into an aqueous solution of sodium chloride having a mass percentage of 3% for 30 min (at 35° C.). The release paper and the film were dried in an oven for 2 h at 50° C. The total thickness of the film was controlled as 0.10 mm by adjusting the thickness of the solid-liquid mixture coated onto the release paper. After the release paper and the film were cooled, the release paper was removed, and the film was cut to a proper size according to practical application requirements, so as to obtain the titanium dioxide-based special synthetic paper product.

In this embodiment, in the solid-liquid mixture, the mass percentage of the polyurethane material was 15.6%, the mass percentage of the N,N-dimethylformamide was 68.8%, and the mass percentage of the titanium dioxide was 15.6%. The synthetic paper product was white, 0.10 mm in thickness and 5.10 g in mass (as a piece of A4 paper).

Embodiment 2

15 kg of polyether-based polyurethane particles having a Shore hardness of 90 A, 15 kg of polyester-based polyurethane particles having a Shore hardness of 90 A and 110 kg of N,N-dimethylacetamide were added in a reactor, then heated to 60° C. and stirred to fully dissolve the thermoplastic polyurethane particles to obtain a polyurethane solution. The polyurethane solution was added with 20 kg of titanium dioxide powder in 600 meshes and 25 kg of titanium dioxide powder in 800 meshes and then uniformly stirred by a high-speed stirrer to obtain a solid-liquid mixture. The solid-liquid mixture was stood for 6 h for defoaming. Subsequently, the solid-liquid mixture was coated onto a piece of release paper at a certain thickness, and the release paper was soaked into an aqueous solution of silver nitrate having a mass percentage of 4% for 40 min (at 20° C.). After the solid-liquid mixture was completely cured to form a film, the release paper and the film are soaked into an aqueous solution of sodium chloride having a mass percentage of 5% for 50 min (at 30° C.). The release paper and the film were dried in an oven for 1.5 h at 55° C. The total thickness of the film was controlled as 0.15 mm by adjusting the thickness of the solid-liquid mixture coated onto the release paper. After the release paper and the film were cooled, the release paper was removed, and the film was cut to a proper size according to practical application requirements, so as to obtain the titanium dioxide-based special synthetic paper product.

In this embodiment, in the solid-liquid mixture, the mass percentage of the polyurethane material was 16.2%, the mass percentage of the N,N-dimethylacetamide was 59.5%, and the mass percentage of the titanium dioxide was 24.3%. The synthetic paper product was white, 0.15 mm in thickness and 5.91 g in mass (as a piece of A4 paper).

Embodiment 3

18 kg of polyether-based polyurethane particles having a Shore hardness of 92 A, 10 kg of polyester-based polyurethane particles having a Shore hardness of 92 A and 110 kg of N,N-dimethylformamide were added in a reactor, then heated to 70° C. and stirred to fully dissolve the thermoplastic polyurethane particles to obtain a polyurethane solution. The polyurethane solution was added with 11.9 kg of titanium dioxide powder in 1250 meshes and 30 kg of titanium dioxide powder in 2000 meshes and then uniformly stirred by a high-speed stirrer to obtain a solid-liquid mixture. The solid-liquid mixture was stood for 7 h for defoaming. Subsequently, the solid-liquid mixture was coated onto a piece of release paper at a certain thickness, and the release paper was soaked into an aqueous solution of silver nitrate having a mass percentage of 6% for 50 min (at 30° C.). After the solid-liquid mixture was completely cured to form a film, the release paper and the film are soaked into an aqueous solution of sodium chloride having a mass percentage of 4% for 40 min (at 25° C.). The release paper and the film were dried in an oven for 1 h at 60° C. The total thickness of the film was controlled as 0.18 mm by adjusting the thickness of the solid-liquid mixture coated onto the release paper. After the release paper and the film were cooled, the release paper was removed, and the film was cut to a proper size according to practical application requirements, so as to obtain the titanium dioxide-based special synthetic paper product.

In this embodiment, in the solid-liquid mixture, the mass percentage of the polyurethane material was 15.6%, the mass percentage of the N,N-dimethylformamide was 61.1%, and the mass percentage of the titanium dioxide was 23.3%. The synthetic paper product was white, 0.18 mm in thickness and 6.57 g in mass (as a piece of A4 paper).

Embodiment 4

22 kg of polyester-based polyurethane particles having a Shore hardness of 95 A and 110 kg of N,N-dimethylacetamide were added in a reactor, then heated to 80° C. and stirred to fully dissolve the polyester-based polyurethane particles to obtain a polyurethane solution. The polyurethane solution was added with 50 kg of titanium dioxide powder in 2500 meshes and then uniformly stirred by a high-speed stirrer to obtain a solid-liquid mixture. The solid-liquid mixture was stood for 8 h for defoaming. Subsequently, the solid-liquid mixture was coated onto a piece of release paper at a certain thickness, and the release paper was soaked into an aqueous solution of silver nitrate having a mass percentage of 5% for 60 min (at 35° C.). After the solid-liquid mixture was completely cured to form a film, the release paper and the film are soaked into an aqueous solution of sodium chloride having a mass percentage of 6% for 60 min (at 20° C.). The release paper and the film were dried in an oven for 2 h at 57° C. The total thickness of the film was controlled as 0.25 mm by adjusting the thickness of the solid-liquid mixture coated onto the release paper. After the release paper and the film were cooled, the release paper was removed, and the film was cut to a proper size according to practical application requirements, so as to obtain the titanium dioxide-based special synthetic paper product.

In this embodiment, in the solid-liquid mixture, the mass percentage of the polyurethane material was 12.1%, the mass percentage of the N,N-dimethylacetamide was 60.4%, and the mass percentage of the titanium dioxide was 27.5%. The synthetic paper product was white, 0.25 mm in thickness and 7.14 g in mass (as a piece of A4 paper).

What is claimed is:

1. A method for preparing titanium dioxide-based synthetic paper capable of degrading organic pollutants, comprising the following steps:

(1) adding thermoplastic polyurethane particles and N,N-dimethylformamide or N,N-dimethylacetamide in a reactor at a mass ratio of 22-30:110, heating to 50° C. to 80° C., and stirring to fully dissolve the thermoplastic polyurethane particles in a solvent to obtain a polyurethane solution;

(2) adding titanium dioxide powder in the polyurethane solution obtained in the step (1) at a mass ratio of the polyurethane solution to the titanium dioxide powder of 132-140:25-50, stirring uniformly to obtain a solid-liquid mixture, and standing for 5 h to 8 h for defoaming;

(3) uniformly coating the solid-liquid mixture obtained in the step (2) onto a piece of release paper, soaking the release paper coated with the solid-liquid mixture into an aqueous solution of silver nitrate for 30 min to 60 min, completely curing the solid-liquid mixture to form a film, and soaking the release paper and the film into an aqueous solution of sodium chloride for 30 min to 60 min;

(4) drying the release paper and the film obtained in the step (3) in an oven for 1 h to 2 h at 50° C. to 60° C., cooling the release paper and the film, removing the release paper, and cutting the film to a proper size according to practical application requirements to obtain the titanium dioxide-based synthetic paper.

2. The method for preparing titanium dioxide-based synthetic paper according to claim 1, wherein the titanium dioxide-based synthetic paper obtained in the step (4) is white, the thickness of the titanium dioxide-based synthetic paper is controlled between 0.10 mm to 0.25 mm by adjusting the thickness of the solid-liquid mixture coated onto the release paper in the step (3), and the mass of the titanium dioxide-based synthetic paper as a piece of A4 paper is 5.10 g to 7.14 g.

3. The method for preparing titanium dioxide-based synthetic paper according to claim 1, wherein the titanium dioxide is titanium dioxide powder having a particle size of 325 to 2500 meshes.

4. The method for preparing titanium dioxide-based synthetic paper according to claim 1, wherein the thermoplastic polyurethane material is one or two of polyether-based TPU and polyester-based TPU, in form of particles having a Shore hardness of 85 A to 95 A.

5. The method for preparing titanium dioxide-based synthetic paper according to claim 1, wherein the solvent in the step (1) is one of N,N-dimethylformamide and N,N-dimethylacetamide.

6. The method for preparing titanium dioxide-based synthetic paper according to claim 1, wherein, in the solid-liquid mixture obtained in the step (2), the mass percentage of the polyurethane is 12.1% to 16.2%, the mass percentage of the solvent is 59.5% to 68.8%, and the mass percentage of the titanium dioxide is 15.6% to 27.5%.

7. The method for preparing titanium dioxide-based synthetic paper according to claim 1, wherein, in the step (3), the mass percentage of the aqueous solution of silver nitrate is 3% to 6%, and the temperature is 20° C. to 35° C.

8. The method for preparing titanium dioxide-based synthetic paper according to claim 1, wherein, in the step (3), the mass percentage of the aqueous solution of sodium chloride is 3% to 6%, and the temperature is 20° C. to 35° C.

* * * * *